(12) United States Patent
Pouliquen et al.

(10) Patent No.: US 11,025,069 B2
(45) Date of Patent: Jun. 1, 2021

(54) SYSTEM FOR DISTRIBUTING MIXED DC AND AC ELECTRICAL POWER FOR SUPPLYING VARIABLE FREQUENCY LOADS AND FIXED FREQUENCY LOADS

(71) Applicant: GE Energy Power Conversion Technology Limited, Rugby (GB)

(72) Inventors: Jean-Louis Pouliquen, Villebon sur Yvette (FR); Loic Leclere, Belfort (FR)

(73) Assignee: GE ENERGY POWER CONVERSION TECHNOLOGY LIMITED, Warwickshire (GB)

( * ) Notice: Subject to any disclaimer, the term of this patent is extended or adjusted under 35 U.S.C. 154(b) by 0 days.

(21) Appl. No.: 16/350,069

(22) PCT Filed: Feb. 15, 2017

(86) PCT No.: PCT/EP2017/053354
§ 371 (c)(1),
(2) Date: Aug. 22, 2018

(87) PCT Pub. No.: WO2017/140706
PCT Pub. Date: Aug. 24, 2017

(65) Prior Publication Data
US 2020/0083717 A1  Mar. 12, 2020

(30) Foreign Application Priority Data
Feb. 18, 2016 (EP) .................................. 16305181

(51) Int. Cl.
*H02J 4/00* (2006.01)
*H02J 3/46* (2006.01)
*H02J 5/00* (2016.01)

(52) U.S. Cl.
CPC .................................. *H02J 4/00* (2013.01); *H02J 3/46* (2013.01); *H02J 5/00* (2013.01)

(58) Field of Classification Search
CPC .................. H02J 3/46; H02J 4/00; H02J 5/00
USPC .......................................................... 307/24
See application file for complete search history.

(56) References Cited

U.S. PATENT DOCUMENTS

2014/0008988 A1*  1/2014  Clarke ..................... H02J 3/46
                                                                  307/84

* cited by examiner

*Primary Examiner* — Hal Kaplan
(74) *Attorney, Agent, or Firm* — Wood IP LLC

(57) ABSTRACT

Electrical power distribution system for supplying a set of fixed-frequency loads and a set of variable-frequency loads, includes a set of at least one fixed-frequency AC voltage generator and a set of at least one variable-frequency AC voltage generator, a DC distribution network supplying the variable-frequency loads by means of inverter stages, a first set of rectifier stages connected between the fixed-frequency generators and the distribution network, and a second set of rectifier stages connected between the variable-frequency generators and the DC distribution network. The first set of rectifier stages includes bidirectional rectifiers capable of providing a bidirectional transfer of power and protection means against fault currents connected between the bidirectional rectifiers and the distribution network.

16 Claims, 3 Drawing Sheets

SYSTEM FOR DISTRIBUTING MIXED DC AND AC ELECTRICAL POWER FOR SUPPLYING VARIABLE FREQUENCY LOADS AND FIXED FREQUENCY LOADS

BACKGROUND OF THE INVENTION

Embodiments of the invention relate to electrical energy distribution systems and, more particularly, electrical energy distribution systems onboard ships, for supplying the electrical loads of a ship, such as the propulsion system, in particular for electrically powered ships, or for the supply of other electrical loads.

Embodiments of the invention also relate in general to electrical energy distribution systems used in other applications for supplying various types of electrical energy loads.

For example, in another application, such a system can be used in avionics and be intended to be placed onboard an aircraft or be used on the ground.

In the prior art, electrical power distribution systems onboard ships with full electric propulsion or "FEP" for short, comprise power generators, made for example from turbines and/or diesel engines driving generators connected to a primary distribution network, which directly feeds the propulsion engines by means of power converters and supplies a secondary distribution network that supplies auxiliary loads of relatively high power or relatively low power.

In this regard, reference can be made to EP 1 914 162, which describes the architecture of such a power distribution system according to the prior art.

With reference to FIG. 1, in which we recognize the turbines T and diesel engines D that drive the generators G that supply the busbars B of a primary distribution network, we can see that the propulsion engines PM of the ship are directly supplied by the power available on the busbars B by means of power converters PC, while the busbars B' of a secondary distribution network and the busbars B" of a tertiary distribution network respectively supply the loads C' and C" of relatively high power and relatively low power.

The busbars B' of the secondary network are supplied from the primary network by means of transformers $T_x$. The busbars B of the primary network and the busbars B' of the secondary network are interconnected by circuit-breakers, illustrated by the reference signs "X". Such protection means are also provided at various characteristic points of the distribution system.

The circuit-breakers are used for the protection of portions of the distribution network when a fault occurs, such as a short-circuit or an impedance fault, i.e. in case of a localized drop in the resistance of a portion of the distribution network, by isolating the portion of the network in question to prevent the propagation of a fault current.

The document EP 1 914 162 further regulates voltage converters provided between the generator and the distribution network when a fault current arises.

It has been found that electrical energy distribution devices according to the prior art suffer from a number of disadvantages.

Firstly, in the distribution systems used in FEP type ships or, in general, in electrical distribution systems of this type, a plurality of generators are used, which supply the primary distribution network in parallel, which are selectively activated as required.

However, as is conceivable when driving the generators from diesel engines, the operation of the motors is not optimized insofar as they operate at a nominal fixed speed and are called upon as required. The speed of the drive motors of the generators is therefore not controlled according to the electrical load.

In addition, it is known to supply various loads from a common DC bus. When these loads operate in generator mode, the common bus is used to recover the energy and supply other loads.

An electrical power distribution architecture using a DC type common bus thus makes it possible to recover power from a load operating in generator mode for the supply of other loads.

Thus, an electrical power distribution system must be able to meet a number of requirements.

It must be able to provide redundant power to the loads, and to implement a degraded operating mode that ensures continuity of service, while allowing the regeneration of the power provided by this load when operating in generator mode.

It must also be able to provide such a redundant power supply of fixed-frequency loads (e.g., depicted as "F" in FIG. 1) and variable-frequency loads.

It must, of course, be able to provide protection to the distribution network in the event of a fault, in particular in the event of a short-circuit or impedance fault in portions of the network.

The object of embodiments of the invention is thus to limit the fault currents in a bidirectional electrical power distribution system supplying fixed-frequency loads and variable-frequency loads supplied from a DC distribution network.

BRIEF SUMMARY

The object of embodiments of the invention is thus an electrical power distribution system for supplying a set of variable-frequency loads and a set of fixed-frequency loads, comprising a set of at least one fixed-frequency AC voltage generator and a set of at least one variable-frequency AC voltage generator, a DC distribution network supplying said variable-frequency loads by means of inverter stages, a first set of rectifier stages connected between the fixed-frequency generators and the distribution network, and a second set of rectifier stages connected between the variable-frequency generators and the DC distribution network.

The first set of rectifier stages comprises bidirectional rectifiers capable of providing a bidirectional transfer of power and protection means against fault currents connected between the bidirectional rectifiers and the distribution network.

In one embodiment, the distribution system includes a first distribution network powered by the fixed-frequency generators and a second distribution network powered by the first and second sets of rectifier stages and supplying the variable-frequency loads by means of the inverter stages.

According to another characteristic of embodiments of the invention, the protection means comprise semiconductor devices controlled as a function of a current flowing from the rectifiers or the voltage of the second DC distribution network.

In one embodiment, the semiconductor devices comprise two thyristors connected in antiparallel.

According to yet another characteristic of the electrical energy distribution system, the latter comprises a diode connected to the terminals of the bidirectional rectifiers, between said rectifiers and the second distribution network.

The distribution system may further comprise means for making the inverter stages have a unidirectional current.

Such means may comprise a diode placed in series between the second network and an inverter stage.

According to another characteristic, the electrical power distribution system according to embodiments of the invention comprises, for each generator in the second distribution network, controllable means for interrupting a fault current flowing from said generator.

These controllable means for interrupting the fault current may, for example, comprise a thyristor bridge connected to the output of the generator.

In one embodiment, said rectifier stages each comprise a filter input stage, a bidirectional rectifier circuit and a stage for smoothing the DC voltage supplied by the rectifier circuit.

In an embodiment, a disconnecting stage is arranged between each rectifier stage and the second distribution network.

The disconnecting stage may comprise motorized disconnectors capable of opening at zero load.

In one embodiment, at least one portion of the inverter stages comprises a braking chopper having braking resistors capable of dissipating the energy from the loads.

In an embodiment, the first distribution network comprises network portions each supplied by a fixed-frequency AC voltage generator and connected together by circuit-breakers.

The second distribution network may comprise network portions supplied respectively by the variable-frequency generators and by the rectifier stages and connected together by AC type circuit-breakers operating at zero voltage when opened and under full voltage when closed.

Embodiments of the invention also relate, according to a second aspect, to an electrical power distribution method for supplying a set of fixed-frequency loads and a set of variable-frequency loads, for the implementation of a distribution system as defined above, in which the distribution network is supplied by bidirectional rectifiers when the fixed-frequency generators are inactive by providing regulation and protection functions.

BRIEF DESCRIPTION OF THE DRAWINGS

Other objectives, characteristics and advantages of embodiments of the invention will become apparent on reading the following description, given solely by way of a non-limiting example, with reference to the accompanying drawings, in which.

DETAILED DESCRIPTION

Figure 2:
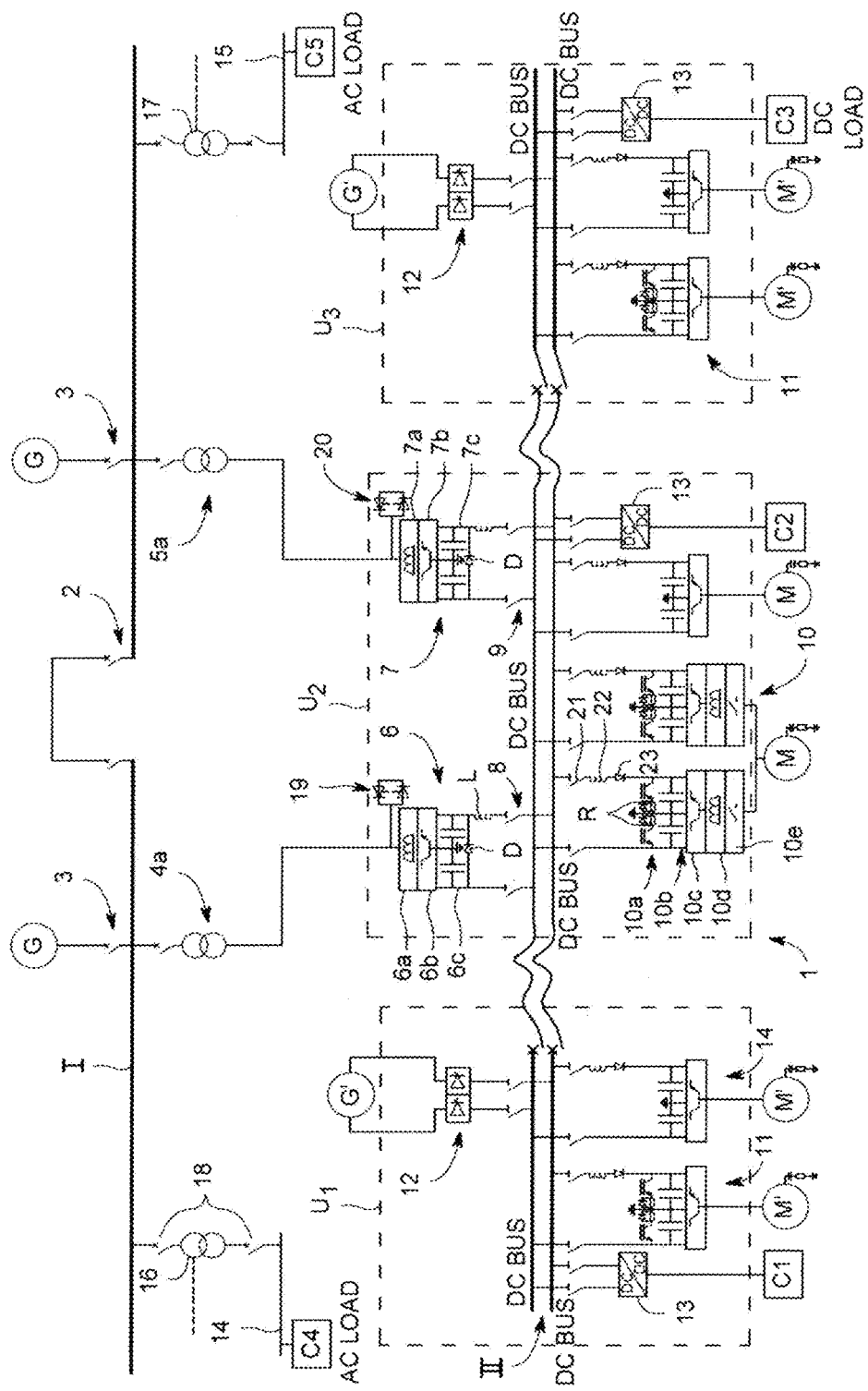
FIG. 2 shows the general architecture of an electrical power distribution system.

FIG. 2 represents an electrical power distribution system according to embodiments of the invention, designated by the general numeric reference 1.

This electrical power distribution system constitutes a mixed AC and DC distribution system and is intended for the supply of variable-frequency electrical loads and fixed-frequency electrical loads.

The distribution system thus comprises a primary distribution network I to which a plurality of redundant generators G are connected, supplying fixed-frequency AC power to the primary network I, and a secondary network II supplied, on the one hand, by the primary network I and by variable-frequency generators G'.

As can be seen, the primary and secondary distribution networks I and II consist of busbars connected to each other by circuit-breakers such as 2, which are intended to ensure the isolation of portions of the distribution networks in the event of a fault. Similarly, the generators G are connected to the set of busbars of the primary network 1 by circuit-breakers 3. In the illustrated example, the primary network comprises a set of two busbars, each supplied by a generator. Of course, it is not beyond the scope of embodiments of the invention when the network is provided with any number of busbars each supplied by one or more generators G.

As can be seen, for the supply of variable-frequency loads, the distribution system here comprises three DC distribution boards U1, U2, U3. As will be detailed below, the DC distribution boards supply variable-frequency loads, such as motors M and M', by means of inverters 10 and 11. They are also intended for supplying DC loads C1 and C2 by means of DC/DC converters.

Of course, it is not beyond the scope of embodiments of the invention to use any number of DC distribution boards.

The DC distribution board U2 is connected to the set of busbars of the primary network I by transformers 4a and 5a. It is supplied redundantly by each of the busbars of the primary network.

The DC distribution board U2 comprises two bidirectional rectifiers 6 and 7 which ensure the rectification of the voltage supplied by the set of busbars of the primary network I and supplies the rectified voltage to the secondary network II by means of disconnecting stages comprising disconnectors 8 and 9. As can be seen in FIG. 2, the set of busbars of the secondary network is also supplied by variable-frequency generators G'.

The variable-frequency loads M and M' are supplied by the busbar of the secondary network II by means of inverters such as 10 and 11.

The distribution system thus comprises redundant fixed-frequency generators G, which supply a fixed-frequency AC voltage to the primary network and which supply the secondary network by means of rectifiers 6 and 7 and generators G', each associated with a rectifier stage 12, which supply the set of busbars of the secondary network.

We thus obtain a parallel supply of the various loads from redundant generators. As shown, the variable-frequency loads M and M' can be supplied by the inverters 10 and 11 connected to the secondary network.

The busbars of the secondary network are connected in parallel, the inverter stages being controlled to ensure the supply of the variable-frequency loads.

As indicated above, the secondary network II also supplies DC loads C1, C2 and C3 by means of 13 DC/DC converters. These loads could be energy storage devices such as batteries or supercapacitors, or other devices such as braking choppers.

Fixed-frequency loads connected to power buses, such as 14 and 15, themselves connected to the primary network by transformers 16 and 17, by means of circuit-breakers, such as 18, are thus supplied by the primary network I.

Note, however, that the rectifiers 6 and 7 of the distribution board U2 are bidirectional rectifiers that provide a bidirectional electrical power transfer. It is thus possible to supply the fixed-frequency primary network from the electrical energy available in the secondary network, by using the bidirectional rectifiers when, for example, the fixed-frequency generators are inactive or the power supplied by the fixed-frequency generator(s) is insufficient.

The primary network and the fixed-frequency loads connected to this primary network can therefore be supplied by the available electrical power of the secondary network.

Similarly, when loads connected to the distribution board U2 operate in generator mode, the electrical energy supplied by these loads can be regenerated and supplied to other loads connected to the distribution system.

The bidirectional rectifiers thus have a filter stage 6a, 7a arranged at the input, on the AC side, followed by a rectifier circuit 6b, 7b converting the AC voltage received from the primary network I into DC voltage, and a smoothing stage 6c, 7c.

On the DC side, the bidirectional rectifiers 6 and 7 are provided with an inductor L and, as indicated above, a disconnector 8, 9, for example a motorized disconnector, capable of opening at zero load.

In addition, the bidirectional rectifiers 6 and 7 are provided with protection circuits 19 and 20 connected in parallel between the transformers 4a and 5a and the bidirectional rectifiers 6 and 7 which make it possible to protect the distribution networks in the event of a short-circuit or impedance fault.

As can be seen, the protection circuits 19 and 20 comprise two thyristors connected in antiparallel and constitute a current dimming circuit, also known as a "crowbar". Other devices could also be used, alternatively, for example devices based on semiconductors, such as IGCTs (integrated gate-controlled thyristors) or GTOs (gate turn-off thyristors).

Such a circuit makes it possible to absorb a short-circuit current by creating a low-resistance circuit in the path of a fault current.

In addition, between the smoothing circuit 6c and the set of busbars of the secondary distribution network II, the rectifier circuits are provided with diodes D which make it possible to avoid an inversion or oscillation of the voltage in the presence of a resonant circuit appearing in the event of a fault.

As regards the inverters 10, these comprise in the first place a braking chopper 10a provided with braking resistors R ensuring the dissipation of the energy during the inversion of the speed of the motor M.

In addition, a smoothing stage 10b, an inverter 10c, a filter stage 10d and a disconnector 10e jointly supply the variable-frequency loads.

Of course, some inverters may lack a brake chopper, smoothing stage or filter stage.

As can be seen, the inverters 10 are connected to the set of busbars of the secondary network by means of the disconnectors 21, inductors 22 and diodes 23 intended to maintain the unidirectionality of the current of the inverters 10.

Thus, the electrical energy distribution system is first provided with protection means comprising a current dimmer or "crowbar" connected, on the AC side, between the primary distribution network and each bidirectional rectifier to absorb the fault currents that may appear on the DC side. Such a protection device can be made from thyristors controlled by a current sensor provided on the DC side, for example between the set of busbars of the secondary distribution network and the bidirectional rectifier or at the voltage level of the second DC distribution network.

In addition, a diode D is connected between the terminals of the bidirectional rectifier, on the DC side, to prevent the formation of an oscillatory system, in particular from the capacitors of the smoothing stage 6c appearing in the event of a fault.

In addition, the variable-frequency generators G' are associated with controllable means (a controllable unit 12) intended to interrupt the fault current that would be able to flow from the generators.

As can be seen, these means comprise thyristors which are connected between the outputs of the generators G' and which are controllable by means of current sensors arranged, for example, at the output of the generators, to be able to interrupt a fault current from the generators G'. Other devices could also be used, alternatively, for example devices based on semiconductors, such as IGCTs (integrated gate-controlled thyristors) or GTOs (gate turn-off thyristors).

As can be seen, the above-described embodiments of the invention, which uses bidirectional rectifiers arranged between the primary network supplied by fixed-frequency generators and the secondary network which supplies the loads, makes it possible, in particular, to implement a bidirectional power transfer between the primary and secondary networks and therefore the division of the power distribution between the loads connected to the distribution system. The use of the current dimmer, which cooperates with the diodes connected to the terminals of each rectifier stage and the thyristor circuits connected to the output of the variable-frequency generators, also makes it possible to limit the effects of a short-circuit capable of appearing in portions of the distribution system, without the use of a fuse protection device.

Finally, it is noted that embodiments of the invention are not limited to the described embodiment.

In fact, in the embodiment described with reference to FIG. 2, the distribution system comprises a primary network supplied by generators supplying a fixed-frequency AC voltage and a secondary network supplied, on the one hand, by the primary network by means of bidirectional rectifiers and, on the other hand, by variable-frequency generators by means of rectifiers, which supplies variable-frequency loads and DC loads, where fixed-frequency loads are able to be supplied by the primary network.

Figure 1:
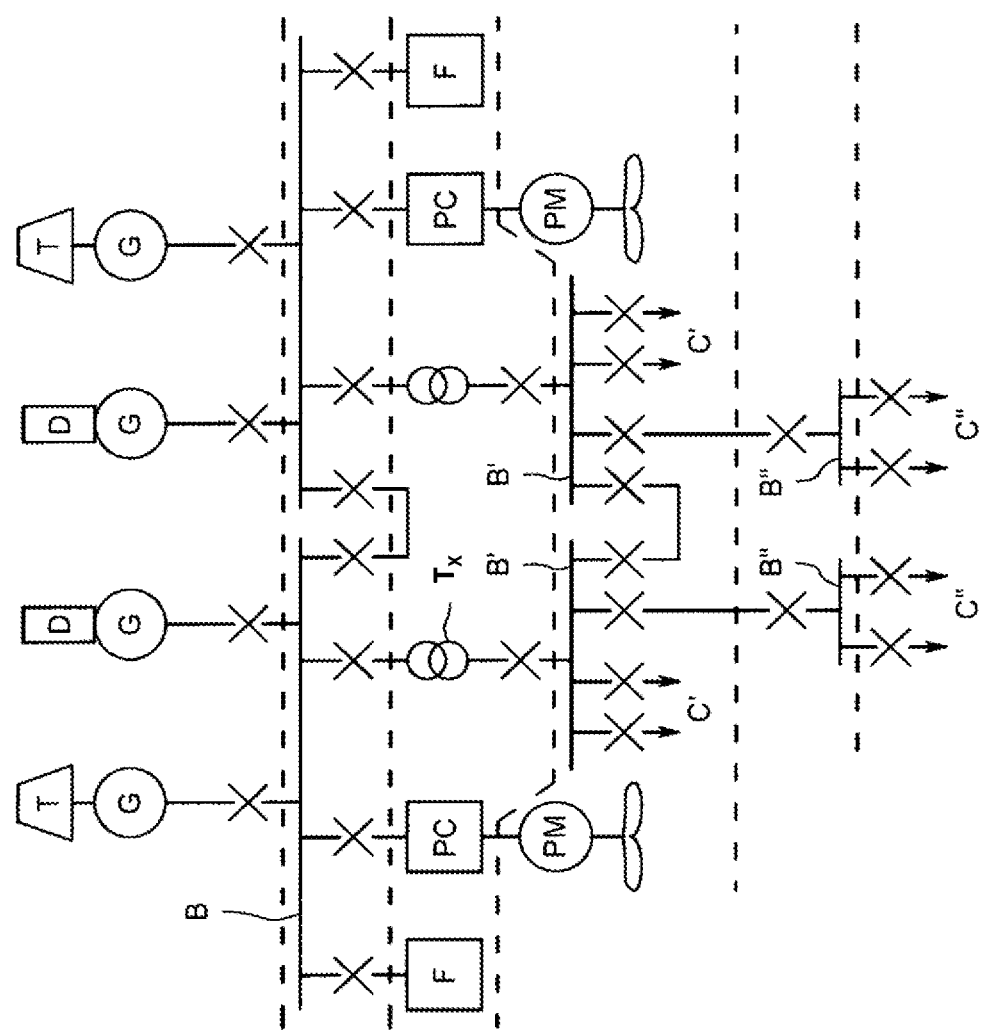
FIG. 1, which has already been mentioned, shows the architecture of an electrical energy distribution system according to the prior art.
Figure 3:
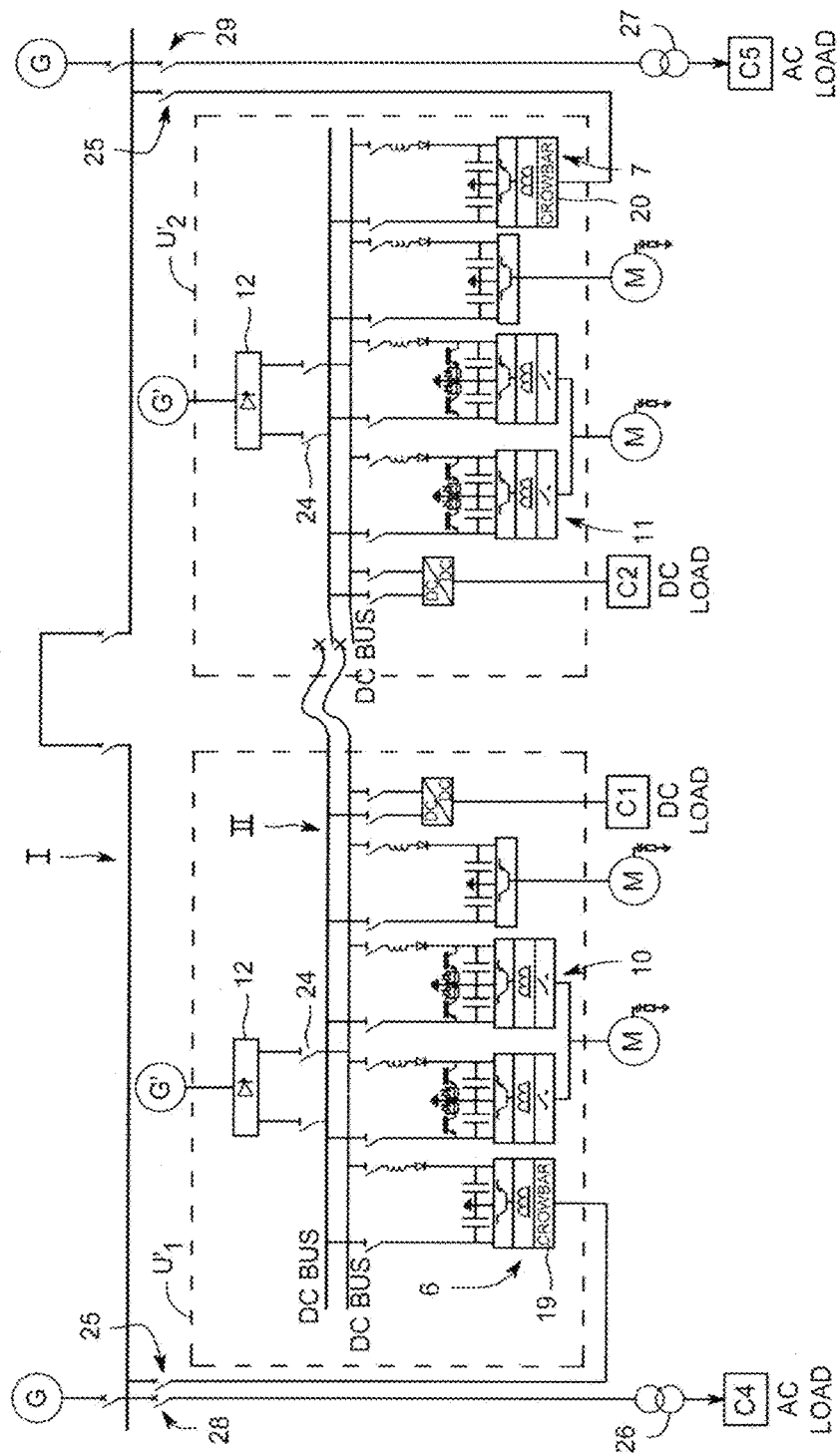
FIG. 3 shows another embodiment of an electrical power distribution system.

In the exemplary embodiment shown in FIG. 3, in which elements identical to those of FIG. 1 are designated by the same references, the system comprises two fixed-frequency AC voltage generators G supplying a primary network I comprising a set of busbars respectively supplied by the generators G and two generators G' of variable-frequency AC voltage supplying two distribution boards U'1 and U'2.

The distribution boards U'1 and U'2 comprise rectifier stages 12 connected to the network II by means of disconnectors 24 and the primary network I supplies a secondary network II and a secondary network II.

The primary network I is connected to the boards by means of circuit-breakers 25.

In this figure, we recognize the bidirectional rectifiers 6 and 7, supplied by the primary network to supply the secondary network, which are equipped with dimmers 19 and 20, shown schematically in FIG. 3, and the inverters 10 and 11, identical to the inverters described above with reference to FIG. 2, connected to the secondary network II to supply variable-frequency loads M.

Fixed-frequency loads C1 and C2 are supplied by the fixed-frequency generators G by means of transformers 26 and 27 and circuit-breakers 28 and 29.

The operation of the distribution system described in FIG. 3 is similar to that described with reference to FIG. 2 and makes it possible to supply the primary network by means of bidirectional rectifiers in the absence of fixed-frequency generators G.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrical power distribution system for supplying a set of fixed-frequency loads and a set of variable-frequency loads, comprising:
    a set of at least one fixed-frequency AC voltage generator and a set of at least one variable-frequency AC voltage generator,
    a DC distribution network supplying the variable-frequency loads by inverter stages,
    a first set of connected rectifier stages connected between the fixed-frequency AC voltage generators and the DC distribution network, and
    a second set of rectifier stages connected between the AC voltage variable-frequency generators and the DC distribution network, wherein the first set of rectifier stages comprises bidirectional rectifiers capable of providing a bidirectional power transfer and a protection circuit against fault currents connected between the bidirectional rectifiers and the DC distribution network.

2. The electrical power distribution system according to claim 1, comprising a first DC distribution network powered by the AC voltage fixed-frequency generators and a second DC distribution network powered by the first and second sets of rectifier stages and supplying the variable-frequency loads by the inverter stages.

3. The electrical power distribution system according to claim 2, whereby the protection circuit comprises semiconductor devices controlled as a function of the voltage of the second DC distribution network.

4. The electrical power distribution system according to claim 2, comprising a diode connected to the terminals of the bidirectional rectifiers, between said rectifiers and the second DC distribution network.

5. The electrical power distribution system according to claim 2, comprising a diode placed in series between the second DC distribution network and an inverter stage.

6. The electrical power distribution system according to claim 2, comprising, for each generator in the second DC distribution network, a controllable unit for interrupting a fault current flowing from the generator.

7. The electrical power distribution system according to claim 6, whereby the controllable unit for interrupting the fault current comprise a thyristor bridge connected to the output of the generator.

8. The electrical power distribution system according to claim 2, whereby the rectifier stages each comprise a filter input stage, a bidirectional rectifier circuit and a stage for smoothing the DC voltage supplied by the rectifier circuit.

9. The electrical power distribution system according to claim 8, further comprising a disconnecting stage arranged between each rectifier stage and the second DC distribution network.

10. The electrical power distribution system according to claim 8, whereby the disconnecting stage comprises motorized disconnectors capable of opening at zero load.

11. The electrical power distribution system according to claim 2, whereby the first DC distribution network comprises network portions each supplied by a fixed-frequency AC voltage generator and connected together by AC circuit-breakers.

12. The electrical power distribution system according to claim 2, whereby the second DC distribution network comprises network portions supplied respectively by the variable-frequency generators and by the rectifier stages and connected together by AC circuit-breakers operating at zero voltage when opened.

13. The electrical power distribution system according to claim 1, whereby the protection circuit comprises semiconductor devices controlled according to a current flowing from the rectifiers.

14. The electrical power distribution system according to claim 13, whereby the semiconductor devices comprise two antiparallel thyristors.

15. The electrical power distribution system according to claim 1, whereby at least one portion of the inverter stages comprises a braking chopper having braking resistors capable of dissipating the energy from the loads.

16. An electrical power distribution method for supplying a set of fixed-frequency loads and a set of variable-frequency loads using the electrical power distribution system, according to claim 1, the method comprising:
    generating the set of fixed-frequency loads using the set of at least one fixed-frequency AC voltage generator and generating the set of variable-frequency loads using the set of at least one variable-frequency AC voltage generator;
    supplying, via the DC distribution network, the variable-frequency loads by inverter stages; and
    supplying the DC distribution network, via the bidirectional rectifiers, the bidirectional power transfer and protection via the protection circuit when the fixed-frequency generators are inactive.

* * * * *